United States Patent
Redferm (10) Patent No.: US 7,023,937 B2
(45) Date of Patent: Apr. 4, 2006

(54) RECEIVER WINDOW DESIGN FOR MULTICARRIER COMMUNICATION SYSTEMS

(75) Inventor: Arthur John Redferm, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 675 days.

(21) Appl. No.: 09/797,095

(22) Filed: Mar. 1, 2001

(65) Prior Publication Data

US 2002/0163983 A1   Nov. 7, 2002

(51) Int. Cl.
*H04L 25/08* (2006.01)

(52) U.S. Cl. .................... 375/346; 375/349; 375/350; 370/201; 455/214; 455/216; 455/283; 455/307

(58) Field of Classification Search ................ 375/316, 375/340, 346, 349, 350, 229, 232; 370/201, 370/281, 464, 465, 481, 482, 485, 497; 455/199, 455/214, 216, 283, 296
See application file for complete search history.

(56) References Cited

U.S. PATENT DOCUMENTS

| | | | | |
|---|---|---|---|---|
| 6,014,412 | A * | 1/2000 | Wiese et al. | 375/346 |
| 6,097,763 | A * | 8/2000 | Djokovic et al. | 375/260 |
| 6,240,129 | B1 * | 5/2001 | Reusens et al. | 375/222 |
| 6,563,841 | B1 * | 5/2003 | Nedic et al. | 370/480 |
| 6,650,617 | B1 * | 11/2003 | Belotserkovsky et al. | 370/210 |

FOREIGN PATENT DOCUMENTS

| | | |
|---|---|---|
| EP | 0 441 732 A1 | 8/1991 |
| EP | 0 734 133 A1 | 9/1996 |
| EP | 1 043 875 A2 | 10/2000 |
| EP | 1 081 907 A1 | 3/2001 |

OTHER PUBLICATIONS

Muschallik, Claus, "Improving an OFDM Reception Using an Adaptive Nyquist Windowing," *IEEE Transactions on Consumer Electronics*, vol. 42, No. 3, Aug. 1996, pp. 259-269 XP 000638500.

Muschallik, Von Claus, "Zeitfensterung Eines OFDM-Signals Zur Verbesserung Des Storabstands im Empfanger," *Rundfunktechnische Mitteilungen*, Mensing, vol. 40, No. 3, Sep. 1996, pp. 90-101 XP 000624656.

Muller-Weinfurtner, Stefan, et al., "Optimum Nyquist Windowing for Improved OFDM Receivers," *IEEE Global Telecommunications Conference*, Nov. 27, 2000, New York, US, pp. 711-715 XP-001017179.

Van Acker, Katleen, et al., "Combination of Per Tone Equalization and Windowing in DMT-Receivers," *Signal Processing*, vol. 81, No. 8, Aug. 2001, Amsterdam, NL, pp. 1571-1579.

(Continued)

*Primary Examiner*—Dac V. Ha
(74) *Attorney, Agent, or Firm*—Abdul Zindani; W. James Brady, III; Frederick J. Telecky, Jr.

(57) ABSTRACT

A receiver window design algorithm (210) is developed which minimizes the noise power of the demodulated multicarrier signal. The windows are effective on a variety of different channels and noise sources. Receiver windowing is a computationally efficient technique for reducing noise spreading in multicarrier communication systems.

27 Claims, 3 Drawing Sheets

OTHER PUBLICATIONS

Muller-Weinfurtner, Stefan, et al., "Robust OFDM Reception with Near-Optimum Nyquist Window," *IEEE Vehicular Technology Conference*, Sep. 19-22, 1999, New York, US, pp. 289-293 XP 000929057.

Nedic, Slobodan, et al., "Per Tone Adaptive Equalization in DMT Receivers with Selective Windowing," *IEEE International Conference on Communications*, Jun. 11-14, 2001, Piscataway, US, pp. 179-183 XP-002203963.

* cited by examiner

FIG. 1
(CONVENTIONAL)

RECEIVER WINDOW DESIGN FOR MULTICARRIER COMMUNICATION SYSTEMS

FIELD OF THE INVENTION

The present invention relates generally to communication systems, and more particularly to a receiver window for minimizing the noise power of a demodulated multicarrier signal.

BACKGROUND OF THE INVENTION

Communication systems employing multicarrier modulation have become increasingly popular. A common multicarrier modulation, discrete multitone modulation (DMT), uses the Fourier transform for modulation and demodulation. DMT assigns different numbers of bits to different subchannels depending on the subchannel signal to noise ratio (SNR), which allows it to approach capacity for frequency selective channels. A related multicarrier modulation, orthogonal frequency division multiplexing (OFDM), assigns a fixed number of bits to all subchannels. Examples of wireline systems using DMT include asymmetric digital subscriber lines (ADSL) and one of the proposed very high speed digital subscriber line (VDSL) standards. OFDM appears in wireless systems such as digital audio and video broadcasting and wireless networking.

One of the reasons for the popularity of DMT is the existence of simple equalization schemes to compensate for frequency selective or multipath channels based on the use of a cyclic prefix. At the DMT transmitter the input is segmented into blocks, the inverse discrete Fourier transform (IDFT) is applied, and a cyclic prefix is added. At the receiver the cyclic prefix is removed and the discrete Fourier transform (DFT) of the data is taken. Fast Fourier transform (FFT) and inverse fast Fourier transform (IFFT) algorithms are typically used to implement the DFT and IDFT, respectively. If the channel memory (including transmit and receive filters) is less than or equal to the length of the cyclic prefix (or has been shortened to that length by a time-domain equalizer (TEQ)), then the frequency selective channel is effectively divided into parallel flat fading subchannels. Equalization is then possible for the subchannels by multiplying each of them by a complex number (known as the frequency-domain equalizer (FEQ)).

For most standards which use DMT the length of the cyclic prefix is fixed. The length is determined based on some typical or worst case channel assumption. However, in practice, many observed channels will be shorter than (or can be shortened to a length less than) the cyclic prefix.

Narrowband interferers such as radio frequency interference (RFI) can result in noise which is strongly correlated between subchannels. RFI significantly degrades system performance, since noise which is not periodic in the subchannel spacing gets spread to many subchannels. This is because the selection of the data and discarding of the prefix is equivalent to multiplying the received signal (including noise) by a rectangular window. Multiplication in time is equivalent to convolution in the frequency-domain with a sinc-like function. Since the sidelobes of the sinc are relatively high and decay rather slowly, narrowband interference can effect a large number of subchannels.

Receiver windowing is a technique which exploits redundant information in the cyclic prefix to improve the SNR of the equalized signal. As its name suggests, receiver windowing is a receiver-only technique, so it is applicable to systems without requiring a change to the transmitter (which is typically the specified part of a standard). Receiver windowing is well suited to cases where the channel is shorter than the prefix, and there is strong correlation in the noise. It works by using samples from the cyclic prefix to construct a window which effects the noise component of the received signal, but leaves the data component of the received signal alone. The result is that the noise is convolved in frequency with a window which has lower sidelobes than the sinc-like function, so it spreads less to neighboring subchannels. The low complexity of receiver windowing fits in well with the rest of the DMT receiver structure.

A number of variations on the receiver windowing operation have been proposed in the literature. Fixed windows (typically based on Hamming, Hann or raised cosine shapes) have been proposed. The use of a DFE to remove structured subchannel interference which resulted from a long window has been proposed. The combination of per tone equalization and receiver windowing was considered, and it was shown that windowing effectively lengthens the per tone equalizers (i.e., receiver windowing is a subset of per tone equalization). In essence, per tone equalization computes a window and equalizer for each subchannel.

SUMMARY OF THE INVENTION

The present invention achieves technical advantages as a new receiver window design and method. The shape of the window is adapted for the observed channel and noise conditions to minimize the error of the equalized signal in the frequency-domain. However, the windowing operation and design is incorporated into the TEQ/FEQ equalization structure rather than the per tone equalization structure. The algorithm also applies to DMT systems where there is only a FEQ (no TEQ). An advantageous aspect of the algorithm is its ability to design for SNR improvement on specific subsets of subchannels. Both block based and iterative versions of the window design algorithm are provided.

The receiver windowing may be incorporated into a DMT system, and contains block based and adaptive versions of a new receiver window design algorithm. However, the present invention is applicable to OFDM as well.

DETAILED DESCRIPTION OF THE PREFERRED EMBODIMENT

By way of example and illustration, DMT is discussed for the development of the algorithms and analysis. The present invention, however, applies to OFDM as well and limitation to the systems described hereafter is not to be inferred.

Figure 1:
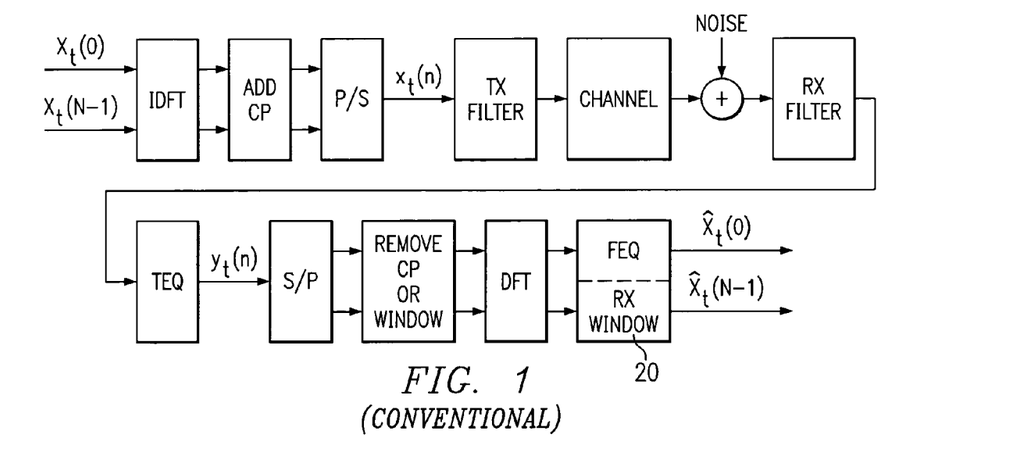
FIG. 1 is a simplified block diagram of a DMT system, where $v_i(n)$ corresponds to the noise filtered by the Rx filter and TEQ.

Consider the simplified DMT system 10 shown in FIG. 1. The input symbols are segmented into blocks of length N, where different signal constellations can be used for each symbol and the block may be conjugate symmetric. Define the input symbols as $X_t(k), k=0, \ldots, N-1$, where the subscript t is used to indicate the tth block of data, and k refers to the kth subchannel.

The DMT transmitter takes an N point IDFT of the tth block, and adds the last P samples of the result to the front (the addition of a cyclic prefix) to form $X_t(n)$, $n=0, \ldots, N+P-1$. This can be written as:

$$x_t(n) = \begin{cases} x_t(n+N) & n = 0, \ldots, P-1 \\ \frac{1}{\sqrt{N}} \sum_{k=0}^{N-1} x_t(k) e^{j\frac{2\pi}{N}k(n-P)} & n = P, \ldots, N+P-1 \end{cases}$$

The sequence $x_t(n)$ is then digital-to-analog converted, filtered, and sent out to the channel. At the receiver, the received signal is filtered and analog to digital converted. Assuming that the combined channel and filtering can be modeled as an finite impulse response (FIR) filter $h(\tau)$ with memory L and additive noise $v_t(n)$ at the output, the sampled received signal $y_t(n)$ is:

$$y_t(n) = \sum_{\tau=0}^{L} h(\tau) x_t(n-\tau) + v_t(n), \, n = 0, \ldots, N+P-1 \quad (2)$$

The DMT receiver discards the first P samples of the received block, and takes a N point DFT of the result. Denoting the DFT of $y_t(n)$ as $Y_t(k)$:

$$Y_t(k) = \frac{1}{\sqrt{N}} \sum_{n=0}^{N-1} y_t(n+P) e^{-j\frac{2\pi}{N}kn} \quad (3)$$

$$= \frac{1}{\sqrt{N}} \sum_{n=0}^{N-1} \sum_{\tau=0}^{L} h(\tau) x_t(n+P-\tau) e^{-j\frac{2\pi}{N}kn} + \quad (4)$$

$$\frac{1}{\sqrt{N}} \sum_{n=0}^{N-1} v_t(n+P) e^{-j\frac{2\pi}{N}kn},$$

$$k = 0, \ldots, N-1.$$

If $L \leq P$ the circular prefix makes linear convolution equivalent to circular convolution and:

$$Y_t(k) = H(k) X_t(k) + V_t(k), \, k=0, \ldots, N-1, \quad (5)$$

where $H(k)$ and $V_t(k)$ are the DFT of the channel and noise, respectively.

The input symbol on the kth subchannel can be recovered by a single complex multiply (the FEQ). For subchannels where $H(k) \neq 0$, the FEQ on the kth subchannel $G(k)$ is:

$$G(k) = \frac{1}{H(k)}, \quad (6)$$

then the input can be recovered as:

$$\hat{X}_t(k) = G(k) Y_t(k) \quad (7)$$

$$= X_t(k) + G(k) V_t(k), \, k = 0, \ldots, N-1. \quad (8)$$

Note that other choices for $G(k)$ are possible. For subchannels where $H(k)=0$, DMT systems do not load these subchannels with data ($X_t(k)=0$) so there is no need to invert these subchannels. OFDM systems use coding or other methods to recover lost information on these subchannels.

Figure 3:
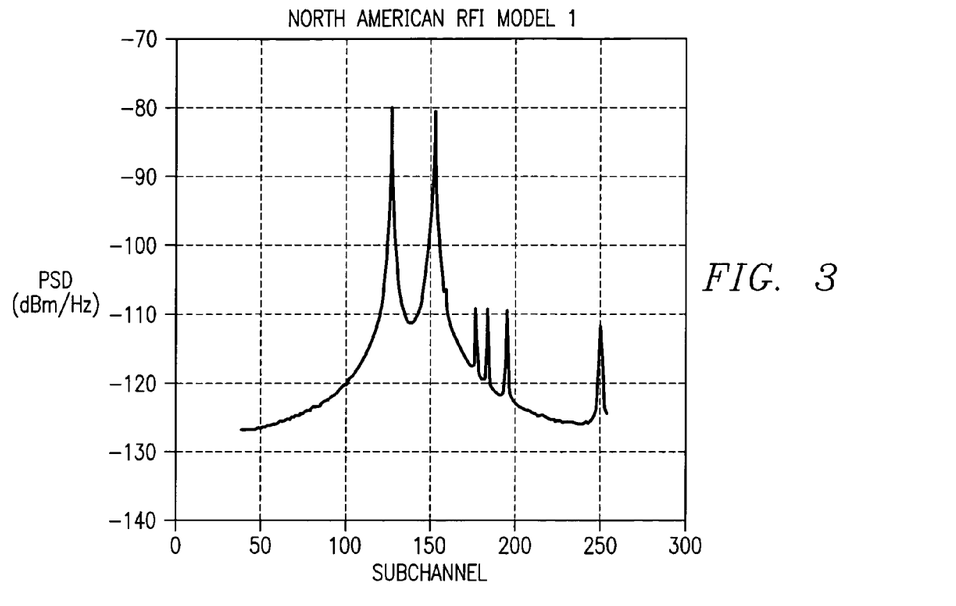
FIG. 3 depicts narrowband noise spreading by the DFT, where frequencies and powers of the sinusoidal interferers correspond to North American RFI model 1 and are given in Table 1.

In taking the DFT of the received signal, there is an implicit time-domain rectangular windowing operation (i.e., the selection of the block to DFT). Windowing in time results in convolution in frequency with a sinc-like function. Because of the high sidelobes of the sinc, there can be spreading of the noise between subchannels. For example, the effect of spreading on sinusoidal interferers is shown in FIG. 3. Receiver windowing can be used to combat this type of interferer.

Figure 2:
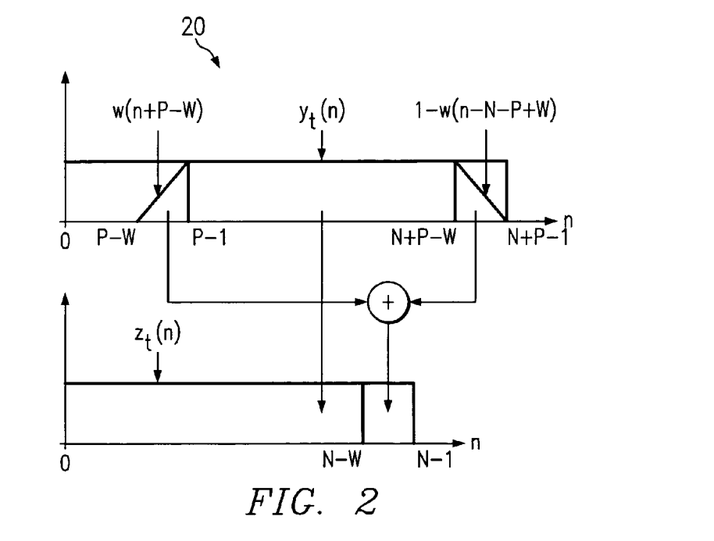
FIG. 2 depicts the receiver windowing operation.

Referring to FIG. 2, there is depicted the present invention whereby receiver windowing works by multiplying the last W samples of the cyclic prefix by a window $w(n)$, $n=0, \ldots, W-1$, and adding them to the last W samples of the received DMT symbol multiplied by $1-w(n)$. The last N samples of the windowed block are then sent to the DFT. If $z_t(n)$, is defined as the windowed block, we can write the first N-W samples of the windowed block as:

$$z_t(n) = y_t(n+P), \, n=0, \ldots, N-W-1, \quad (9)$$

and the last W samples of the windowed block as:

$$z_t(n) = w(n+W-N) y_t(n+P-N) + \quad (10)$$
$$(1-w(n+W-N)) y_t(n+P)$$

$$= y_t(n+P) + w(n+W-N)(y_t(n+P-N) - \quad (11)$$
$$y_t(n+P)),$$

$$n = N-W, \ldots, N-1.$$

Note that when W=0 receiver windowing reduces to cyclic prefix removal.

The DFT of the windowed signal $z_t(k)$ is:

$$Z_t(k) = \frac{1}{\sqrt{N}} \sum_{n=0}^{N-1} z_t(n) e^{-j\frac{2\pi}{N}kn} \quad (12)$$

$$= \frac{1}{\sqrt{N}} \sum_{n=0}^{N-1} y_t(n+P)e^{-j\frac{2\pi}{N}kn} + \quad (13)$$
$$\frac{1}{\sqrt{N}} \sum_{n=N-W}^{N-1} w(n+W-N)(y_t(n+P-N) - y_t(n+P))e^{-j\frac{2\pi}{N}kn},$$
$$k = 0, \ldots, N-1.$$

Substituting (2) and (5) into (13) yields:

$$Z_t(k) = H(k)X_t(k) + \frac{1}{\sqrt{N}} \sum_{n=0}^{N-1} v_t(n+P)e^{-j\frac{2\pi}{N}kn} + \quad (14)$$
$$\frac{1}{\sqrt{N}} \sum_{n=N-W}^{N-1} w(n+W-N)\left(\sum_{\tau=0}^{L} h(\tau)x_t(n+P-N-\tau) + v_t(n+P-N) - \sum_{\tau=0}^{L} h(\tau)x_t(n+P-\tau) - v_t(n+P)\right)$$
$$e^{-j\frac{2\pi}{N}kn}, k = 0, \ldots, N-1.$$

If $L \leq P-W$, then:

$$\sum_{\tau=0}^{L} h(\tau)x_t(n+P-N-\tau) = \sum_{\tau=0}^{L} h(\tau)x_t(n+P-\tau), \quad (15)$$
$$n = N-W, \ldots, N-1,$$

and (14) can be simplified to:

$$Z_t(k) = H(k)X_t(k) + \frac{1}{\sqrt{N}} \sum_{n=-W}^{-1} w(n+W)v_t(n+P)e^{-j\frac{2\pi}{N}kn} + \quad (16)$$
$$\frac{1}{\sqrt{N}} \sum_{n=0}^{N-W-1} v_t(n+P)e^{-j\frac{2\pi}{N}kn} +$$
$$\frac{1}{\sqrt{N}} \sum_{n=N-W}^{N-1} (1-w(n+W-N))v_t(n+P)e^{-j\frac{2\pi}{N}kn},$$
$$k = 0, \ldots, N-1.$$

As in the case of DMT without receiver windowing, a FEQ can be designed using equation (6) to recover the input $X_t(k)$ from equation (16).

From equation (16) we see that by using W samples of the cyclic prefix for the window, if the channel memory is such that $L \leq P-W$, then receiver windowing leaves the data component of the received signal alone, while applying the window to the noise. Typical choices for the window include Hamming, Hann, and raised-cosine shapes.

The computational requirements of receiver windowing are small, which makes it a practical addition to DMT receivers. For a window length of W and using equation (11), receiver windowing requires W additions, W subtractions, and W multiplications per received block of date. Receiver windowing is also parallelizable, since the operations to generate each of the samples $z_t(n)$, $n=N-W, \ldots, N-1$ are independent.

From equation (16), we see that using a tapered window with sidelobes lower than a rectangular window (which corresponds to cyclic prefix removal) results in less spreading of narrow-band interferers to neighboring subchannels. However, receiver windowing can benefit other types of noise such as crosstalk (which is typically modeled as a colored Gaussian process).

To see this, notice that the received signal of equation (2) can be divided into desired signal, undesired signal, and noise terms:

$$y_t(n) = \sum_{\tau=0}^{P-W} h(\tau)x_t(n-\tau) + \sum_{\tau=P-W+1}^{L} h(\tau)x_t(n-\tau) + v_t(n), \quad (17)$$
$$n = 0, \ldots, N+P-1,$$

respectively. For $n=N-W, \ldots, N-1$, subtracting the desired received signal component of equation (17) from the windowed signal $z_t(n)$ leaves the windowed noise $v_{w,t}(n)$:

$$v_{w,t}(n) = w(n+W-N)y_t(n+P-N) \quad (18)$$
$$= (1-w(n+W-N))y_t(n+P) - \sum_{\tau=0}^{P-W} h(\tau)x_t(n-\tau)$$

$$= w(n+W-N) \sum_{\tau=P-W+1}^{L} h(\tau)x_t(n+P-N-\tau) + \quad (19)$$
$$w(n+W-N)v_t(n+P-N) +$$
$$(1-w(n+W-N)) \sum_{\tau=P-W+1}^{L} h(\tau)x_t(n+P-\tau) +$$
$$(1-w(n+W-N))v_t(n+P),$$
$$n = N-W, \ldots, N-1.$$

The first and third terms of equation (19) are signal related interference components due to insufficient channel shortening. The second and fourth terms of equation (19) are the additive noise at the channel output with the window applied to them.

To consider only the effect of the window on the additive noise, it is assumed that the channel is sufficiently short ($L \leq P-W$), such that equation (19) simplifies to:

$$v_{w,t}(n) = w(n+W-N)v_t(n+P-N) + (1-w(n+W-N))v_t(n+P),$$
$$n=N-W, \ldots, N-1. \quad (20)$$

Consider a sample $n \in \{N-W, \ldots, N-1\}$, and let the noise $v_t(n)$ be wide sense stationary with variance $\sigma_v^2 = E[v_t^2(n)]$, where $E[\cdot]$ denotes expected value. The variance of the windowed noise $\sigma_{v_w}^2$ is:

$$\sigma_{v_w}^2 = E[(w(n+W-N)v_t(n+P-N) + \quad (21)$$
$$(1-w(n+W-N))v_t(n+P))^2]$$

$$= w^2(n+W-N)\sigma_v^2 + (1-2w(n+W-N) + \quad (22)$$
$$w^2(n+W-N))\sigma_v^2 + (2w(n+W-N) -$$
$$2w^2(n+W-N))E[v_t(n+P-N)v_t(n+P)]$$

-continued $$\leq w^2(n+W-N)\sigma_v^2 + (1-2w(n+W-N) + \\ w^2(n+W-N))\sigma_v^2 + (2w(n+W-N) - \\ 2w^2(n+W-N))\sigma_v^2 \quad (23)$$

$$= \sigma_v^2, \quad n = N-W, \ldots, N-1. \quad (24)$$

Therefore, for wide sense stationary noise (e.g., the usual assumption made on crosstalk), receiver windowing is also able to provide some benefits, as the windowed noise variance on samples $n=N-W, \ldots, N-1$ is less than or equal to the unwindowed noise variance.

In one preferred embodiment, the receiver window design algorithm is for DMT systems. Block based and adaptive design procedures are given, along with some discussion on the implications of windowing.

In the derivation of the new receiver window design algorithms, conjugation is denoted by *, transpose by $T$, and conjugate transpose by $H$. To minimize the noise at the FEQ output, the window $w(n)$ is formed which minimizes the error of the windowed received signal at the DFT output, $Z_t(k)$, with the noise free DFT output $H(k)X_t(k)$. Equation (13) can be rewritten as:

$$Z_t(k) = \quad (25)$$
$$\frac{1}{\sqrt{N}} \sum_{n=0}^{N-1} y_t(n+P)e^{-j\frac{2\pi}{N}kn} + \frac{1}{\sqrt{N}} \sum_{n=N-W}^{N-1} w(n+W-N)$$
$$(y_t(n+P-N) - y_t(n+P))e^{-j\frac{2\pi}{N}kn}$$

$$= Y_t(k) + y_{e,t}^T(k)w, \quad k = 0, \ldots, N-1, \quad (26)$$

where:

$$y_{e,t}(k) = \frac{1}{\sqrt{N}} \begin{bmatrix} (y_t(P-W) - y_t(N+P-W))e^{-j\frac{2\pi}{N}k(N-W)} \\ \vdots \\ (y_t(P-1) - y_t(N+P-1))e^{-j\frac{2\pi}{N}k(N-1)} \end{bmatrix} \quad (27)$$

and:

$$w = \begin{bmatrix} w(0) \\ \vdots \\ w(W-1) \end{bmatrix} \quad (28)$$

The error between the noise free and windowed DFT output for the kth subchannel of the tth block is:

$$e_t(k) = H(k)X_t(k) - Z_t(k) \quad (29)$$
$$= H(k)X_t(k) - Y_t(k) - y_{e,t}^T(k)w \quad (30)$$

Expanding equation (30) for the set of subchannels $\{k_0, \ldots, k_{K-1}\}$, where $K \leq N$, we can form a vector of the errors as:

$$e_t = \begin{bmatrix} H(k_0)X_t(k_0) - Y_t(k_0) \\ \vdots \\ H(k_{K-1})X_t(k_{K-1}) - Y_t(k_{K-1}) \end{bmatrix} - \begin{bmatrix} y_{e,t}^T(k_0) \\ \vdots \\ y_{e,t}^T(k_{K-1}) \end{bmatrix} w \quad (31)$$

$$= d_t - Y_{X,t}^T w, \quad (32)$$

with the obvious definitions for $d_t$ and $Y_{X,t}^T$. The squared norm of the error vector is:

$$e_t^H e_t = d_t^H d_t - d_t^H Y_{X,t}^T w - w^H Y^*_{X,t} d_t + w^H Y^*_{X,t} Y_{X,t}^T w. \quad (33)$$

Define the cost function $J(w)$ as:

$$J(w) = E[e_t^H e_t] \quad (34)$$

$$= \sigma_d^2 - r^H w - w^H r + w^H R w \quad (35)$$

where $\sigma_d^2 = E[d_t^H d_t]$, $R = E[Y^*_{X,t} Y_{X,t}^T]$, and $r = E[Y^*_{X,t} d_t]$. To minimize the error, the cost function is differentiated with respect to $w^*$ and set the result equal to zero:

$$\frac{\partial J}{\partial w^*} = -r + Rw \quad (36)$$

$$= 0. \quad (37)$$

The window coefficients can be recovered as:

$$\hat{w} = R^{-1}r, \quad (38)$$

where $^{-1}$ denotes the matrix inverse.

Cost functions based on alternative error criteria which lead to different window designs are also possible. For example, consider the factorizable weighting matrix $D=Q^H Q$ and define the weighted cost function as:

$$J_D(w) = E[e_t^H D e_t]. \quad (39)$$

After differentiating equation (39) with respect to $w^*$ and setting the result equal to zero, the window coefficients can be recovered as:

$$\hat{w} = R_D^{-1} r_D, \quad (40)$$

where $R_D = E[Y^*_{X,t} D Y_{X,t}^T]$, and $r_D = E[Y^*_{X,t} D d_t]$.

The window design procedure can also be formulated such that the channel $H(k)$ is identified at the same time as the window coefficients. Note that the error for the kth subchannel of the tth block as can be rewritten as:

$$e_t(k) = -Y_t(k) - [y_{e,t}^T(k) - X_t(k)] \begin{bmatrix} w \\ H(k) \end{bmatrix} \quad (41)$$

Additionally, the error vector et can also be rewritten as:

$$e_t = \begin{bmatrix} -Y_t(k_0) \\ \vdots \\ -Y_t(k_{K-1}) \end{bmatrix} - \begin{bmatrix} y_{e,t}^T(k_0) & -x_t(k_0) \\ \vdots & \ddots \\ y_{e,t}^T(k_{K-1}) & -X_t(k_{K-1}) \end{bmatrix} \begin{bmatrix} w \\ H(k_0) \\ \vdots \\ H(k_{K-1}) \end{bmatrix} \quad (42)$$

$$= \tilde{d}_t - \tilde{Y}_{X,t}^T \tilde{w}, \quad (43)$$

with the obvious definitions for $d_t$, and $Y_{X,t}^T$, and w. The rest of the derivation proceeds as in equations (33)–(38) with $d_t$, $Y_{X,t}^T$, and w replaced by $\tilde{d}_t$, $\tilde{Y}_{X,t}^T$, and $\tilde{w}$ respectively.

Iterative versions of the window design (and channel estimate) procedures can be used if matrix inversions are not practical due to computational resources. Using the error on the kth subchannel for the tth block equation (30), the window estimate can be updated using least-mean squares (LMS) and cycling through the desired subchannels for each received block of data:

$$w_{k+1,t} = w_{k,t} + \mu_t(k) e_t(k) y^*_{e,t}(k), \quad (44)$$

where $w_{k,t}$ is the window estimate when processing the kth subchannel of the tth block of data, and $\mu_t(k)$ controls the rate of adaptation. After all K subchannels of the tth block have been processed, the window for the next block is initialized with $w_{k_0,t+1} = w_{k_{K-1},t}$. A similar iteration can be defined to estimate $\tilde{w}$.

The receiver of the present invention achieves technical advantages by using windowing samples from the cyclic prefix to alter samples from the end of the DMT symbol, which in turn effects the noise in the DFT of the received signal. Using information in the cyclic prefix to improve performance makes sense from an information theoretic viewpoint, and receiver windowing provides a computationally reasonable method of doing so. The result is less noise correlation across subchannels.

The receiver window design algorithms allow for the error in the frequency-domain I received signal to be minimized on a desired set of subchannels. Since the window design is optimized for a given channel and noise environment, as the environment changes the window coefficients are updated (e.g., using equation (44)). Notice that for a given system, its possible to use multiple windows at the receiver, each of which is optimized for a given subset of subchannels. When using different windows for different subsets of subchannels, the number of computations can be reduced (relative to calculating the results of each window on all subchannels) by using fast DFT algorithms designed to compute a subset of input and output points using equation (6).

A drawback for DMT systems with receiver windowing is that (if the channel isn't already short enough) the TEQ needs to shorten the channel to W less samples then without receiver windowing, This gives the channel shortening algorithm fewer degrees of freedom, since in the design of the TEQ the channel is effectively modeled as $$H = \frac{B}{A},$$

where A is the TEQ and B is the target impulse response (TIR) with length P+1. By requiring the TEQ to shorten the channel to L≦P−W, the length of B (the TIR) is reduced by W to P−W+1.

If the channel is shortened such that L≦P−W, then the SNR on symbols $z_t(n)$, n=N−W, . . . , N−1 is as good or better than the SNR on samples $y_t(n)$, n=N+P−W, . . . , N+P−1. However, if the channel is not sufficiently shortened, then windowing could increase the noise (because of interblock interference). A positive aspect of the algorithm in this paper is that it takes the residual of the shortened channel into account in the window design, and therefore can adapt its shape to reflect the resulting channel (after all filtering and shortening).

To illustrate the advantageous performance improvements possible with the window design algorithms of the present invention, the algorithms were simulated in a downstream model of a frequency division multiplexed ADSL system. N=512 conjugate symmetric subchannels were used (i.e., subchannels 0, . . . , 255 are unique) with a prefix length P=32 and block rate of $f_0$=4312.5 Hz. The input PSD mask was a constant −40 dBm/Hz and subchannel 39 was the first downstream subchannel loaded with QAM symbols (to allow for a guard band). 26 gauge (AWG) twisted pair loop (channel) models were used with −140 dBm/Hz additive white Gaussian noise (AWGN) and differential mode North American RFI model 1 noise sources up to 1.104 MHz added to the channel output, as shown in Table 1 for RFI frequencies and powers.

TABLE 1

Inband North American RFI model 1 differential mode powers.

| Frequency (kHz) | Power (dBm) |
|---|---|
| 540 | −40 |
| 650 | −40 |
| 680 | −70 |
| 760 | −70 |
| 790 | −70 |
| 840 | −70 |
| 1080 | −70 |

The data rate of the ADSL system was estimated based on the SNR at the subchannel outputs according to the gap to capacity formula:

$$C = f_0 \sum_{k=0}^{N-1} \log_2\left(1 + \frac{SNR(k)}{\Pi}\right) \quad (45)$$

where Π=loss+margin−coding gain, loss=9.8 dB, margin=6 dB, and coding gain=5 dB. These numbers are reasonable for an ADSL system operating at a $10^{-7}$ bit error rate. The performance of no window and a Hann window was compared to the window design algorithm in equation (39) with the weighting matrix D equal to a diagonal matrix with the SNR's at the output of the Hann windowed system on the diagonal. A window length of W=8 was used for all cases.

Figure 4:
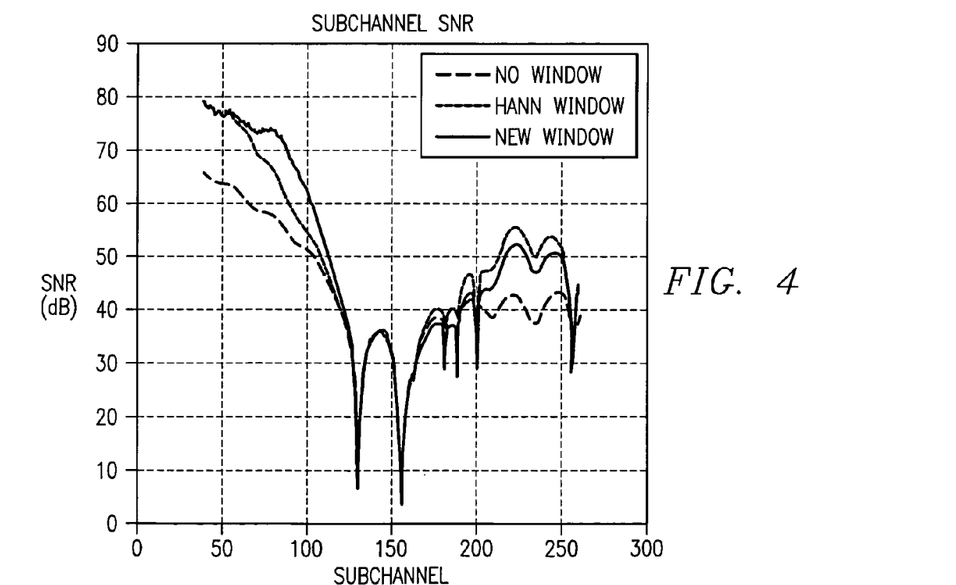
FIG. 4 depicts subchannel SNR for no window, a Hann window, and the new window design procedure.

For the first simulation we considered a 6 kft 26 AWG channel which was shortened to L=P−W=25 samples, and a window designed using subchannels 39, . . . , 255. FIG. 4 shows the SNR for the no window, Hann window, and new window outputs. The new window shows SNR improvement on subchannels 70–110, but results in a SNR less than the Hann window on subchannels greater than 150. However, the net result is a small improvement in data rate as seen in Table 2.

TABLE 2

Data rates for no window, a Hann window, and the new window on a 6 kft 26 AWG channel.

| Window | C (kbps) |
| --- | --- |
| none | 9947 |
| Hann | 11763 |
| new | 11881 |

Figure 5:
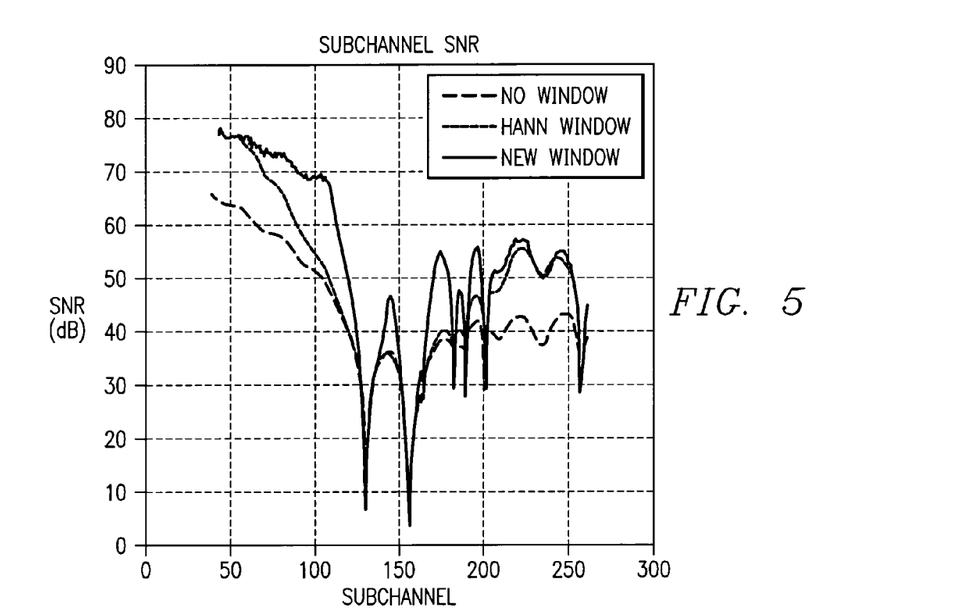
FIG. 5 depicts subchannel SNR for no window, a Hann window, and the new window design procedure using sub channels {39, 120}, {120, 160}, {161, 200}, and {201, 255}.

To further improve the performance of the new window, separate windows were optimized for subchannels {39, 120}, {121, 160}, {161, 200}, and {201, 255}. FIG. 5 shows the SNR possible by using the 4 windows each tailored to a separate set of subchannels. The new window now shows SNR improvement across all of the subchannels relative the Hann and no window cases. Table 3 shows the corresponding data rates of each of the individual windows, and the rate achievable by using all of the windows together (the combined case).

TABLE 3

Data rates for no window, a Hann window, and the new window designed on subsets of the loaded subchannels on a 6 kft 26 AWG channel.

| Window | C (kbps) |
| --- | --- |
| none | 9947 |
| Hann | 11763 |
| new {39, 120} | 10034 |
| new {121, 160} | 4121 |
| new {161, 200} | 8291 |
| new {201, 255} | 10743 |
| new combined | 13284 |

Figure 6:
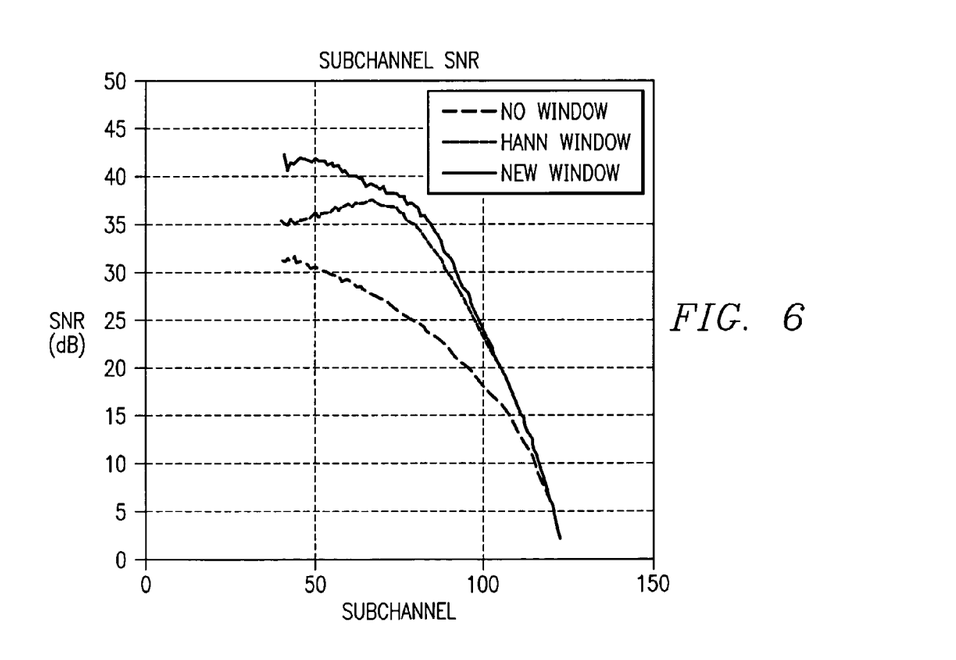
FIG. 6 depicts subchannel SNR for no window, a Hann window, and the new window design procedure.

For the second simulation we considered a 12 kft 26 AWG channel with subchannels 39–120 carrying QAM data. Again, the window was designed from equation (39) using an loaded subchannels. FIG. 6 shows that the SNR of the output of the new window is higher than that of the Hann or no window cases across the whole bandwidth. The corresponding data rates are given in Table 4.

TABLE 4

Data rates for no window, a Hann window, and the new window on a 12 kft 26 AWG channel.

| Window | C (kbps) |
| --- | --- |
| none | 1469 |
| Hann | 2156 |
| new | 2415 |

In summary, the present invention comprises a new receiver window design procedure, applicable to systems such as DMT. Receiver windowing is a computationally reasonable algorithm that is able to provide performance gains when the channel is shorter than the prefix, or can be shortened to a length less than that of the prefix. The window design procedure minimizes the error between the windowed received signal and the noise free signal in the frequency-domain. Performance improvements are most dramatic in the presence of strongly correlated noise sources such as RFI. Simulations demonstrate the ability of the window design procedure to improve data rate on a simulated ADSL system.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

The invention claimed is:

1. A receiver for use with a multicarrier modulation communication system having noise conditions comprising:
a demodulation module dividing a communication channel into multiple subchannels;
an equalizer processing the channel; and
at least one window having a window output applied before the equalizer responsive to an observed channel and the noise conditions and adapted to reduce error in the demodulation module output on a selected set of the subchannels where the communication channel has a cyclic prefix and the window $\hat{w}$ is designed according to the equation:

$$\hat{w} = R^{-1} r$$

where:

$$R = E[Y_{X,t}^* Y_{X,t}^T]$$

$$r = E[Y_{X,t}^* d_t]$$

$$Y_{X,t}^T = \begin{bmatrix} y_{e,t}^T(k_0) \\ \vdots \\ y_{e,t}^T(k_{K-1}) \end{bmatrix}$$

$$y_{e,t}(k) = \frac{1}{\sqrt{N}} \begin{bmatrix} (y_t(P-W) - y_t(N+P-W))e^{-j\frac{2\pi}{N}k(N-W)} \\ \vdots \\ (y_t(P-1) - y_t(N+P-1))e^{-j\frac{2\pi}{N}k(N-1)} \end{bmatrix}$$

$$d_t = \begin{bmatrix} H(k_0)X_t(k_0) - Y_t(k_0) \\ \vdots \\ H(k_{K-1})X_t(k_{K-1}) - Y_t(k_{K-1}) \end{bmatrix}$$

and H(k) is the response of subchannel k, $X_t(k)$ is the input to subchannel k for the tth frame of data, $Y_t(k)$ is the unwindowed demodulator output for subchannel k for the tth frame of data, $y_t(n)$ is the nth received signal from the tth frame of data, N is the number of input symbols, P is the length of the prefix, and W is the length of the window, wherein parameters n, k, t, N, P, and W are integers.

2. The receiver of claim 1 comprising multiple said windows each adapted for a predetermined subset of the subchannels, the window outputs being combined to reduce the error in the demodulator output on a selected set of the subchannels.

3. The receiver of claim 1 comprising multiple said windows each adapted for a predetermined subset of the subchannels, the window outputs being combined to reduce the error in the demodulator output on a selected set of the subchannels.

4. The receiver of claim 1 wherein one or more of the windows are adapted for use in a discrete multitone (DMT) system.

5. The receiver of claim 1 wherein one or more of the windows are adapted for use in an orthogonal division multiplexing (OFDM) system.

6. The receiver of claim 1 where the communicating channel has a cyclic prefix and the window $\hat{w}$ is defined according to the equation:

$$\hat{w} = R_D^{-1} r_D$$

where:

$$R_D = E[Y^*_{X,t} D Y_{X,t}^T]$$

$$r_D = E[Y^*_{X,t} D d_t]$$

$$D = Q^H Q$$

and Q is a matrix.

7. The receiver of claim 6 comprising multiple said windows each adapted for a predetermined subset of the subchannels, the window outputs being combined to reduce the error in the demodulator output on a selected set of the subchannels.

8. The receiver of claim 6 wherein one or more of the windows are adapted for use in a discrete multitone (DMT) system.

9. The receiver of claim 6 wherein one or more of the windows are adapted for use in an orthogonal division multiplexing (OFDM) system.

10. The receiver of claim 1 where the communication channel input has a cyclic prefix and the window $\hat{w}$ is updated iteratively according to the equation:

$$\hat{w} = \hat{w} + \mu(k) e_t(k) y^*_{e,t}(k)$$

where $\mu(k)$ is a scalar and k is an integer.

11. The receiver of claim 10 comprising multiple said windows each adapted for a predetermined subset of subchannels, the window outputs are combined to reduce the error in the demodulator output on a selected set of the subchannels.

12. The receiver of claim 10 wherein one or more of the windows are adapted for use in a discrete multitone (DMT) system.

13. The receiver of claim 10 wherein one or more of the windows are adapted for use in an orthogonal division multiplexing (OFDM) system.

14. The receiver of claim 1 wherein the window is a function of the communication channel defined according to the equation:

$$\begin{bmatrix} \hat{w} \\ H(k_0) \\ \vdots \\ H(k_{K-1}) \end{bmatrix} = \tilde{R}_D^{-1} \tilde{r}_D$$

where:

$$\tilde{R}_D = E[\tilde{Y}^*_{X,t} \tilde{Y}_{X,t}^T]$$

$$\tilde{r}_D = E[\tilde{Y}^*_{X,t} \tilde{d}_t]$$

$$\tilde{Y}_{X,t}^T = \begin{bmatrix} y_{e,t}^T(k_0) & -X_t(k_0) & \\ \vdots & & \ddots \\ y_{e,t}^T(k_{K-1}) & & -X_t(k_{K-1}) \end{bmatrix}$$

$$\tilde{d}_t = \begin{bmatrix} -Y_t(k_0) \\ \vdots \\ -Y_t(k_{K-1}) \end{bmatrix}.$$

wherein K is an integer.

15. The receiver of claim 14 comprising multiple windows each adapted for a different subset of the subchannels, the window outputs are being combined to minimize the error in the demodulator output on a selected set of the subchannels.

16. The receiver of claim 14 wherein one or more of the windows are adapted for use in a discrete multitone (DMT) system.

17. The receiver of claim 14 wherein one or more of the windows are adapted for use in an orthogonal division multiplexing (OFDM) system.

18. A method of receiver windowing in a multicarrier modulation communication system, comprising the steps of:
 a) equalizing a channel having a cyclic prefix; and
 b) shaping at least one receiver window as a function of an observed channel and noise conditions to reduce the number of errors of the equalized channel in the frequency domain, wherein the at least one receiver window is optimized for a given subset of subchannels wherein the DFT of receiver window is defined by the equation:

$$\hat{w} = R^{-1} r$$

where:

$$R = E[Y^*_{X,t} Y_{X,t}^T]$$

$$r = E[Y^*_{X,t} d_t]$$

$$Y_{X,t}^T = \begin{bmatrix} y_{e,t}^T(k_0) \\ \vdots \\ y_{e,t}^T(k_{K-1}) \end{bmatrix}$$

$$y_{e,t}(k) = \frac{1}{\sqrt{N}} \begin{bmatrix} (y_t(P-W) - y_t(N+P-W)) e^{-j\frac{2\pi}{N} k(N-W)} \\ \vdots \\ (y_t(P-1) - y_t(N+P-1)) e^{-j\frac{2\pi}{N} k(N-1)} \end{bmatrix}$$

$$d_t = \begin{bmatrix} H(k_0) X_t(k_0) - Y_t(k_0) \\ \vdots \\ H(k_{K-1}) X_t(k_{K-1}) - Y_t(k_{K-1}) \end{bmatrix}$$

and H(k) is the response of subchannel k, $X_t(k)$ is the input to subchannel k for the tth frame of data, $Y_t(k)$ is the unwindowed demodulator output for subchannel k for the tth frame of data, $y_t(n)$ is the nth received signal from the tth frame of data, N is the number of input symbols, P is the length of the prefix, and W is the length of the window, wherein parameters n, k, t, N, P, and W are integers.

19. The receiver of claim 18 wherein the receiver window is incorporated prior to the FEQ structure.

20. The receiver of claim 18 wherein the receiver window is adapted for use in a discrete multitone (DMT) modulation system.

21. The receiver of claim 18 wherein the receiver window is adapted for use in an orthogonal frequency division multiplexing (OFDM) modulation system.

22. The receiver of claim 18 wherein the receiver window is responsively updated for a given channel and noise environment.

23. The receiver of claim 18 comprising multiple said receiver windows, each said receiver window optimized for a given subset of subchannels.

24. The receiver of claim 18 wherein the receiver window minimizing the noise at the FEQ output is defined by the equation:

$$\hat{w} = R_D^{-1} r_D$$

where:

$$R_D = E[Y^*_{X,t} D Y_{X,t}^T]$$

$$r_D = E[Y^*_{X,t} D d_t]$$

$$D = Q^H Q$$

and Q is a matrix.

25. The receiver of claim 18 wherein the receiver window minimizing the noise at the FEQ output is defined by the equation:

$$\hat{w} = \hat{w} + \mu(k) e_1(k) Y^*_{e,t}(k)$$

where $\mu(k)$ is a scalar and k is an integer.

26. The receiver of claim 18 wherein the receiver window minimizing the noise at the FEQ output is defined by the equation:

$$\begin{bmatrix} \hat{w} \\ H(k_0) \\ \vdots \\ H(k_{K-1}) \end{bmatrix} = \tilde{R}_D^{-1} \tilde{r}_D$$

where:

$$\tilde{R}_D = E[\tilde{Y}^*_{X,t} \tilde{Y}_{X,t}^T]$$

$$\tilde{r}_D = E[\tilde{Y}^*_{X,t} \tilde{d}_t]$$

$$\tilde{Y}_{X,t}^T = \begin{bmatrix} y_{e,t}^T(k_0) & -X_t(k_0) & \\ \vdots & & \ddots \\ y_{e,t}^T(k_{K-1}) & & -X_t(k_{K-1}) \end{bmatrix}$$

$$\tilde{d}_t = \begin{bmatrix} -Y_t(k_0) \\ \vdots \\ -Y_t(k_{K-1}) \end{bmatrix}.$$

where K is an integer.

27. The receiver of claim 18 wherein the receiver window utilizes samples of the cyclic prefix to alter samples from the end of a DMT symbol.

* * * * *

UNITED STATES PATENT AND TRADEMARK OFFICE
CERTIFICATE OF CORRECTION

PATENT NO. : 7,023,937 B2  Page 1 of 1
APPLICATION NO. : 09/797095
DATED : April 4, 2006
INVENTOR(S) : Arthur John Redfern It is certified that error appears in the above-identified patent and that said Letters Patent is hereby corrected as shown below:

On The Title Page Item (75)
On the face of the patent, please replace:

"(75) Inventor: Arthur John Redferm"

with

Item On The Title Page
--(75) Inventor: Arthur John Redfern--

Signed and Sealed this

Twentieth Day of November, 2007

JON W. DUDAS
*Director of the United States Patent and Trademark Office*